United States Patent
Ford

(10) Patent No.: US 6,568,702 B1
(45) Date of Patent: May 27, 2003

(54) NO HOUSING DRIVER'S AIR BAG MODULE

(75) Inventor: Brian C. Ford, Mt. Clemens, MI (US)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/498,158

(22) Filed: Feb. 4, 2000

(51) Int. Cl.[7] .............................................. B60R 21/16
(52) U.S. Cl. .................................. 280/728.2; 280/728.3
(58) Field of Search ........................... 280/728.1, 728.2, 280/728.3, 731

(56) References Cited

U.S. PATENT DOCUMENTS

| | | | |
|---|---|---|---|
| 3,602,284 A | 8/1971 | Smith ........................ 403/252 |
| 4,392,759 A | 7/1983 | Cook ..................... 403/317 X |
| 4,473,316 A | 9/1984 | Welch .................... 403/353 X |
| 5,005,860 A | 4/1991 | Mori et al. ................. 280/731 |
| 5,269,559 A | 12/1993 | Filion et al. ............. 280/728.3 |
| 5,333,897 A | 8/1994 | Landis et al. ............... 280/728 |
| 5,380,037 A | 1/1995 | Worrell et al. .............. 280/728 |
| 5,403,033 A | 4/1995 | Koma ........................ 280/728 |
| 5,423,568 A | 6/1995 | Zushi et al. ............. 280/728.2 |
| 5,470,100 A * | 11/1995 | Gordon .................... 280/728.2 |
| 5,562,301 A | 10/1996 | Lutz ........................ 280/728.2 |
| 5,590,900 A | 1/1997 | Duran et al. ............. 280/728.2 |
| 5,599,039 A | 2/1997 | Goss et al. ............... 280/728.2 |
| 5,630,611 A | 5/1997 | Goss et al. ................. 280/728 |
| 5,639,113 A | 6/1997 | Goss et al. ............... 280/728.2 |
| 5,685,557 A | 11/1997 | Persson et al. .......... 280/728.2 |
| 5,685,560 A | 11/1997 | Sugiyama et al. .......... 280/731 |
| 5,692,773 A | 12/1997 | Ono ........................ 280/728.2 |
| 5,738,370 A * | 4/1998 | Hosoi et al. ................ 280/731 |
| 5,755,458 A * | 5/1998 | Donovan ................. 280/728.2 |
| 5,788,268 A | 8/1998 | Goss et al. ............... 280/728.2 |
| 5,797,622 A * | 8/1998 | Turner et al. ............... 280/731 |
| 5,803,646 A | 9/1998 | Weihrauch |
| 5,882,053 A | 3/1999 | Bekins et al. |
| 5,975,560 A | 11/1999 | Fischer .................... 280/728.2 |
| 5,979,933 A | 11/1999 | Murar et al. ................ 280/731 |
| 6,016,674 A | 1/2000 | Yang .......................... 70/209 |
| 6,029,992 A | 2/2000 | Vendely et al. .......... 280/728.2 |
| 6,036,222 A * | 3/2000 | Holmes et al. .......... 280/728.2 |
| 6,062,592 A * | 5/2000 | Sakurai et al. ........... 280/728.2 |
| 6,079,291 A * | 6/2000 | Hosoi et al. ................. 74/552 |
| 6,109,819 A | 8/2000 | Welch ....................... 403/353 |
| 6,122,992 A * | 9/2000 | Papandreou ................. 74/552 |
| RE36,898 E * | 10/2000 | Sawada et al. ............... 428/43 |
| 6,131,944 A * | 10/2000 | Henkel et al. ........... 280/728.3 |
| 6,149,184 A * | 11/2000 | Ennis et al. ............. 280/728.2 |
| 6,161,863 A * | 12/2000 | Fujita et al. ............. 280/728.2 |
| 6,173,987 B1 * | 1/2001 | Terasawa et al. ........ 280/728.2 |
| 6,196,573 B1 | 3/2001 | Worrell et al. ........... 280/728.2 |
| 6,276,711 B1 | 8/2001 | Kurz et al. .............. 280/728.2 |
| 2001/0030412 A1 * | 10/2001 | Igawa et al. ............. 280/728.2 |

FOREIGN PATENT DOCUMENTS

| | | |
|---|---|---|
| EP | 563943 | 10/1993 |
| EP | 0 741 063 | 11/1996 |
| EP | 0 754 602 | 1/1997 |
| EP | 0 771 696 | 5/1997 |
| JP | 04169356 A | 6/1992 |
| JP | 10236258 A | 9/1998 |

* cited by examiner

*Primary Examiner*—Brian L. Johnson
*Assistant Examiner*—J. Allen Shriver
(74) *Attorney, Agent, or Firm*—Markell Seitzman

(57) ABSTRACT

An air bag module having an inflator (20); a cushion (22); a retainer ring (24) having at least one mounting tab (40) and a plurality of fasteners (28) for engaging the inflator (20) and the cushion (22); a cover (26) having a pair of flaps (44) defining a plurality of apertures for engaging the fasteners (28); and a plurality of snap-in attachment nuts (32). The snap nuts 32 being used to connect the air bag module to an armature (30) of a steering wheel.

15 Claims, 10 Drawing Sheets

NO HOUSING DRIVER'S AIR BAG MODULE

BACKGROUND AND SUMMARY OF THE INVENTION

The present invention relates to a driver's air bag. More particularly, the invention is directed towards an air bag module without a housing for direct attachment to a vehicle's steering wheel.

Commonly, driver's side air bag modules have a cover for enclosing a cushion (or cushion pack assembly) and inflator. Typically, the cushion, inflator and cover are fixably mounted to the housing, the housing having a number of fasteners to attach the air bag module to a vehicle's steering wheel.

The associated housing functions as a stable surface for enclosing the cushion pack assembly and for absorbing the deployment reaction forces. The housing, however, significantly adds to the manufacturing costs and weight of the air bag module. As such, removal of the driver air bag module housing would significantly reduce the cost and increase the ease of manufacturing of the module.

In accordance with the teachings of the present invention, a driver's air bag module of a vehicle's safety restraint system is provided. The module has improved mounting hardware that allows for the utilization of a steering wheel's armature to secure the module and allow for the proper distribution of reaction forces. A wire fastening system is used to secure the module to the steering wheel.

In view of the foregoing, it is an object of the present invention to provide an improved driver's air bag module for a vehicle safety restraint system that may be subsequently utilized to protect an occupant in a crash of the vehicle. Additional advantages and features of the present invention will become apparent from the following description and appended claims, taken in conjunction with the accompanying drawings.

DETAILED DESCRIPTION OF THE DRAWINGS

Figure 1:
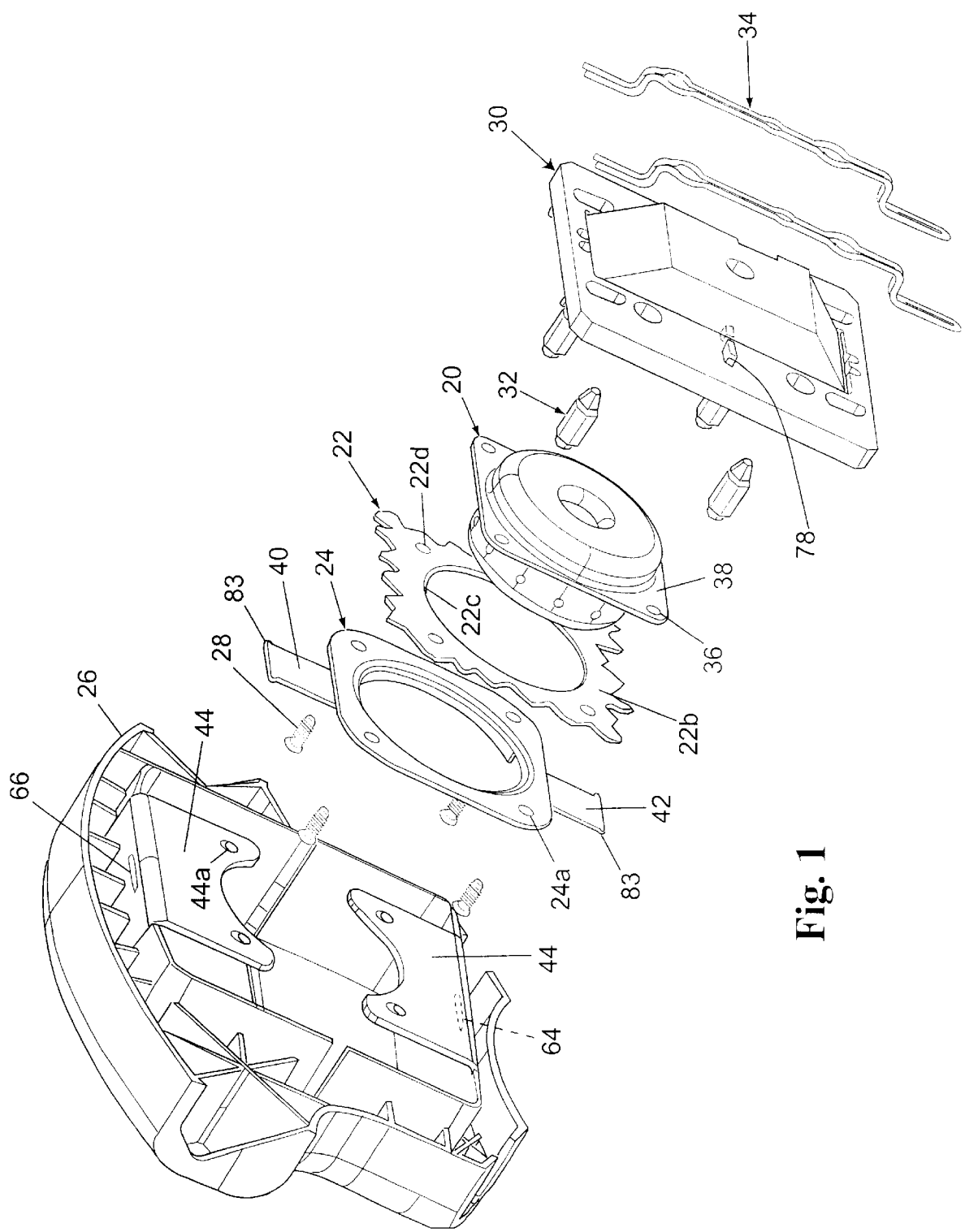
FIG. 1 is an exploded view of the driver air bag module according to the current invention.
Figure 1A:
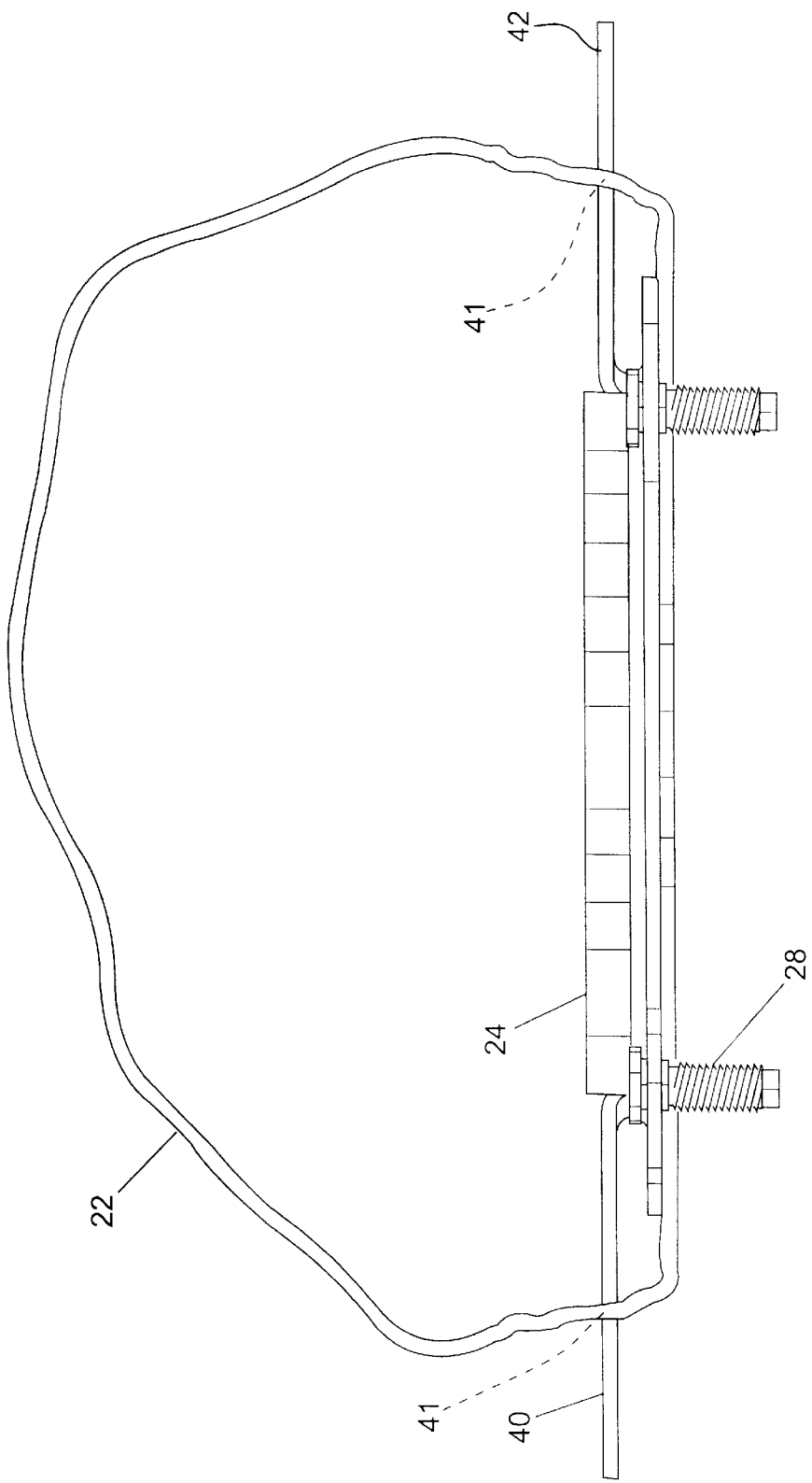
FIG. 1a diagrammatically shows the interrelationship of a cushion and retainer ring.

As is shown in FIG. 1, the air bag module 10 of the present invention is comprised of eight primary components: an inflator 20, a cushion 22, a retainer ring 24, a cover 26, a plurality of threaded studs 28, a steering wheel armature 30, a plurality of snap-in attachment nuts 32 and a pair of retaining or attachment fasteners or clips 34.

Figure 2A:
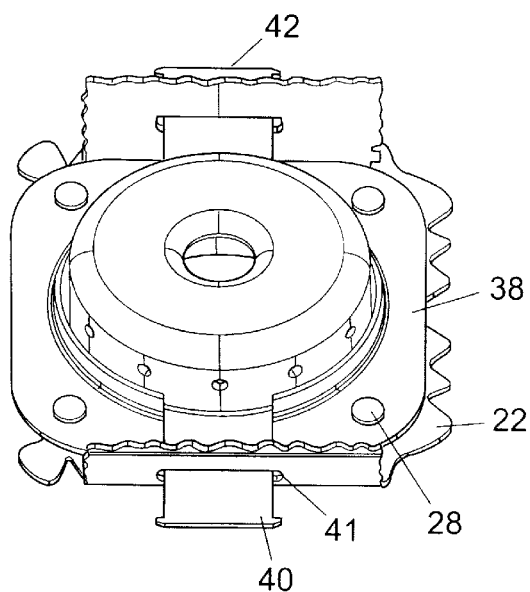
FIGS. 2a and 2b are respective top and bottom isometric views of a retaining ring, inflator and cushion subassembly of the current invention.
Figure 2B:
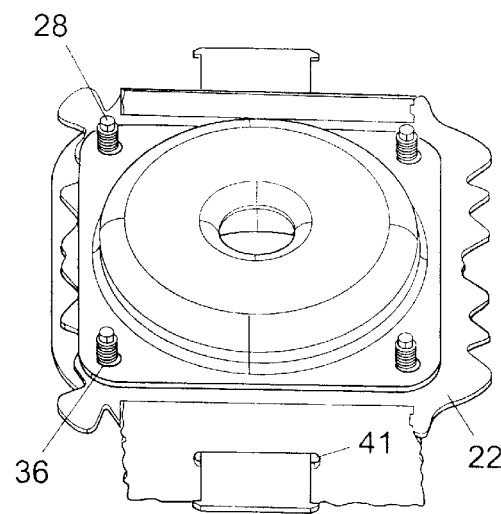

The module 10 is assembled by first placing the retainer ring 24 within the cushion 22. The retainer ring 24 has a pair of tabs 40, 42 which are inserted through corresponding slots 41 (see FIG. 2) in cushion 22. The retainer ring 24 also includes a plurality of holes 24a. The cushion 22 includes a neck 22b with an opening 22c and a plurality of holes 22d that are aligned with holes 24b. A threaded stud 28 is passed through a respective pair of holes 24a in the retainer ring and cushion 22d. The threaded studs 28 extending from the retainer ring 24 are then passed through corresponding holes 36 on the inflator flange 38 (see FIGS. 2a and 2b).

Figure 3:
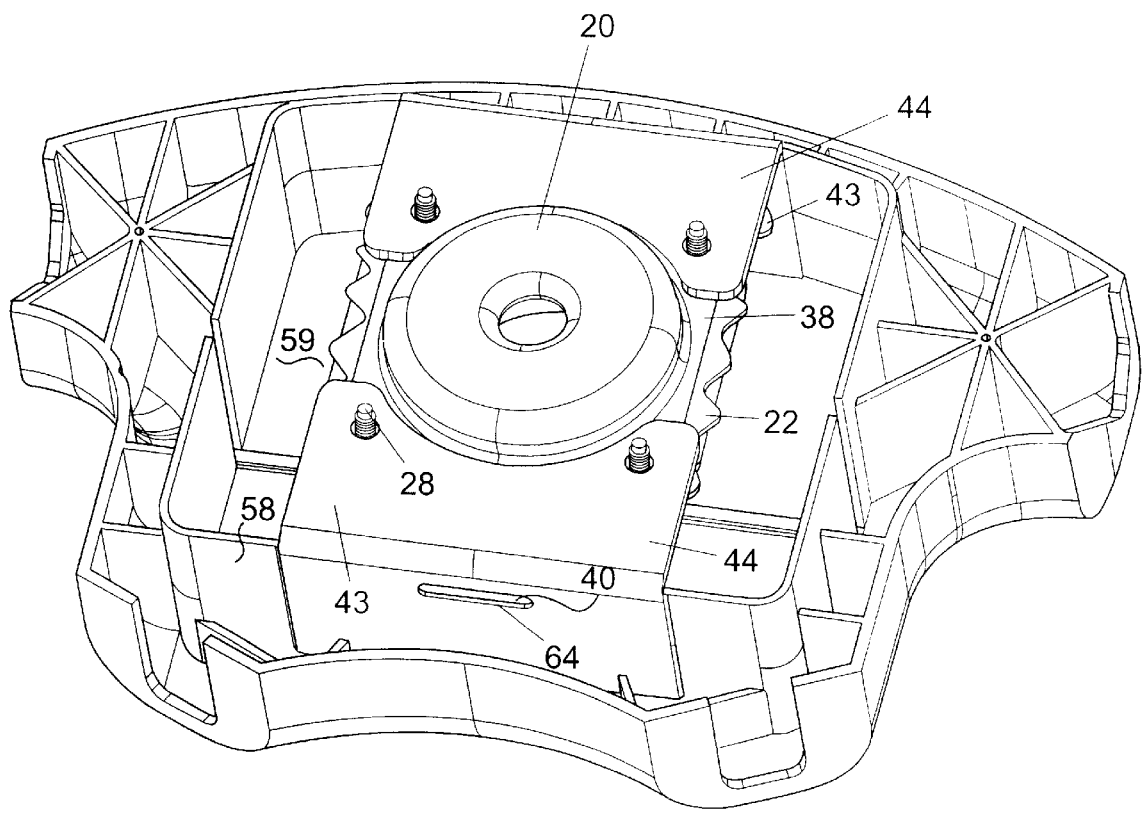
FIG. 3 is a cushion pack and inflator subassembly installed within the driver air bag cover.

The cushion 22 is then folded and an optional layer of Tyvek or other tearable material can be wrapped around the cushion 22 after it is folded to prevent contaminants from entering the bag pack. The cushion assembly comprising the folded cushion 22, the ring 24 and inflator 20 is placed within the cover 26 as shown in FIG. 3. As can be seen from the various figures, the underside of the cover 26 includes a peripheral wall 58, which defines a cavity 59 into which the folded cushion is received. A flap 44 extends from each of two opposing sides 43 of the wall. Each flap includes a plurality of holes 44a. The base of each flap 44 or the top of the adjacent side 43 includes a respective slot 64 or 66. The flaps 44 are shown integral to the cover 26. It is envisioned that they can be formed integrally with the cover 26 or can be an insert-molded substrate. During assembly, as the cushion assembly is placed within the cover cavity, the retainer tabs 40 and 42 are received within a respective slot 41. Each flap 44 is manipulated and folded over the inflator 20 so that a threaded stud 28 extends through a tab opening 44a. As can be appreciated, the threaded studs 28 serve to keep both the cushion 22 and cover 26 in place. The ends of tabs 40 and 42 also contain barbs 83 (see FIG. 9) which prevent the flaps 44 of cover 26 from sliding over the end of the tabs once the module is assembled. The extending ends of the tabs 40, 42 are easily grasped (manually or automatically) and provide the assembly plant (or assembler) with an easy means for transporting the module. In addition, the tabs 40 and 42 improve fit and finish with the steering wheel armature 30 by improving the stability of the cover.

During the deployment of the cushion, the threaded studs 28 prevent movement of the cover 26 parallel to the steering wheel armature 30. As best seen in FIGS. 5a, 5b, 6 and 7, a tear seam, 46 is placed through the entire center of the cover so that during, deployment the cover will split down the center and rotate about a, line or region located somewhere along the flaps. By using this type of tear seam, forces on the stud holes are minimized because the majority of loading is perpendicular to the studs 28.

Figure 4:
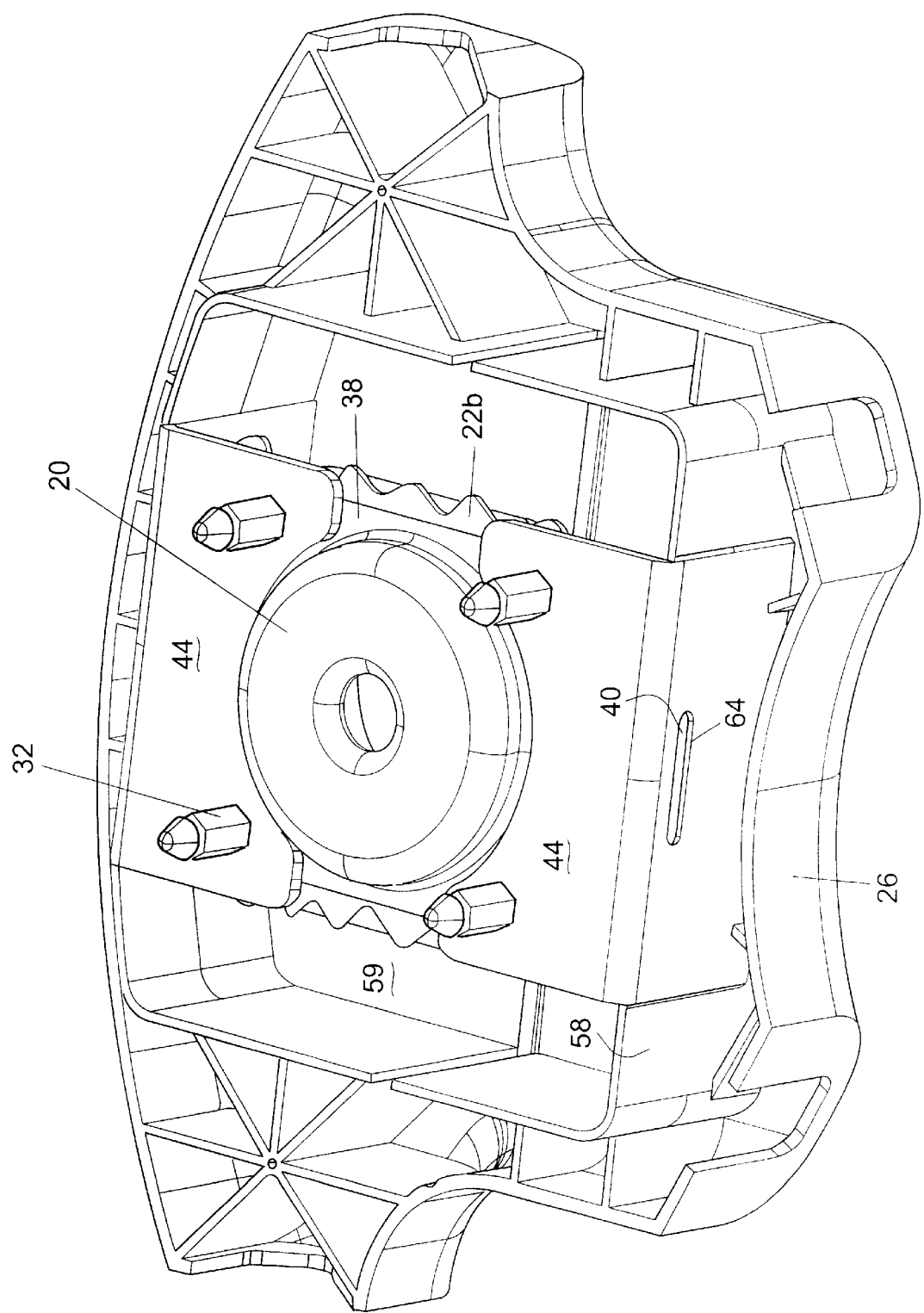
FIG. 4 is a subassembly of the driver air bag module having snap pins disposed thereon.
Figure 5A:
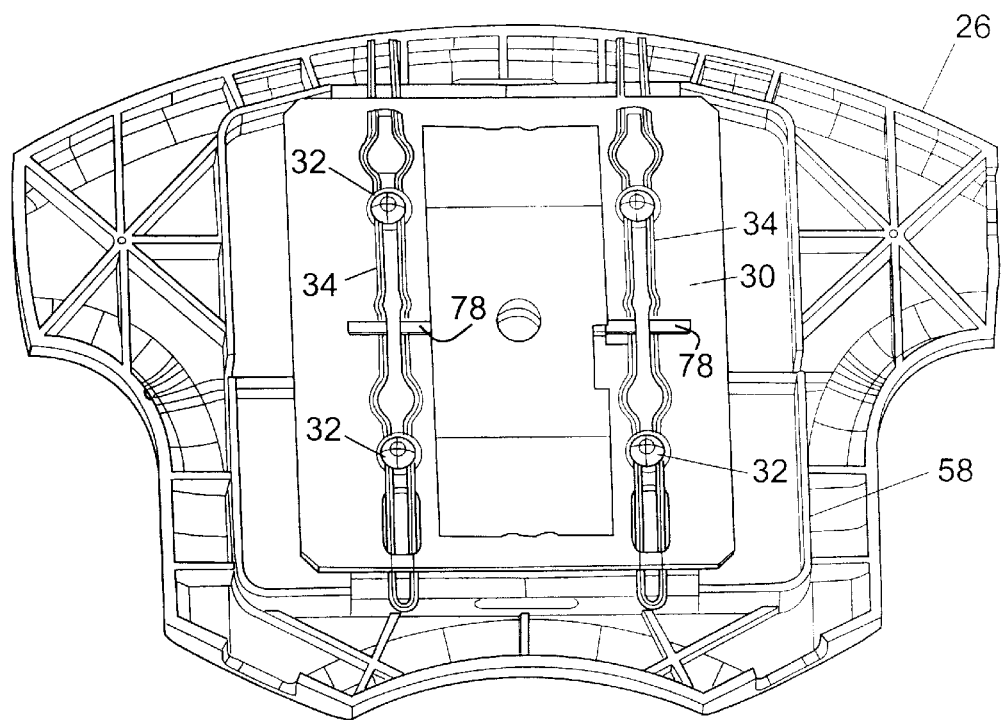
FIG. 5a is a bottom plan view of a driver air bag module of the current invention in the locked position, snapped into attachment wires of a steering wheel armature.
Figure 5B:
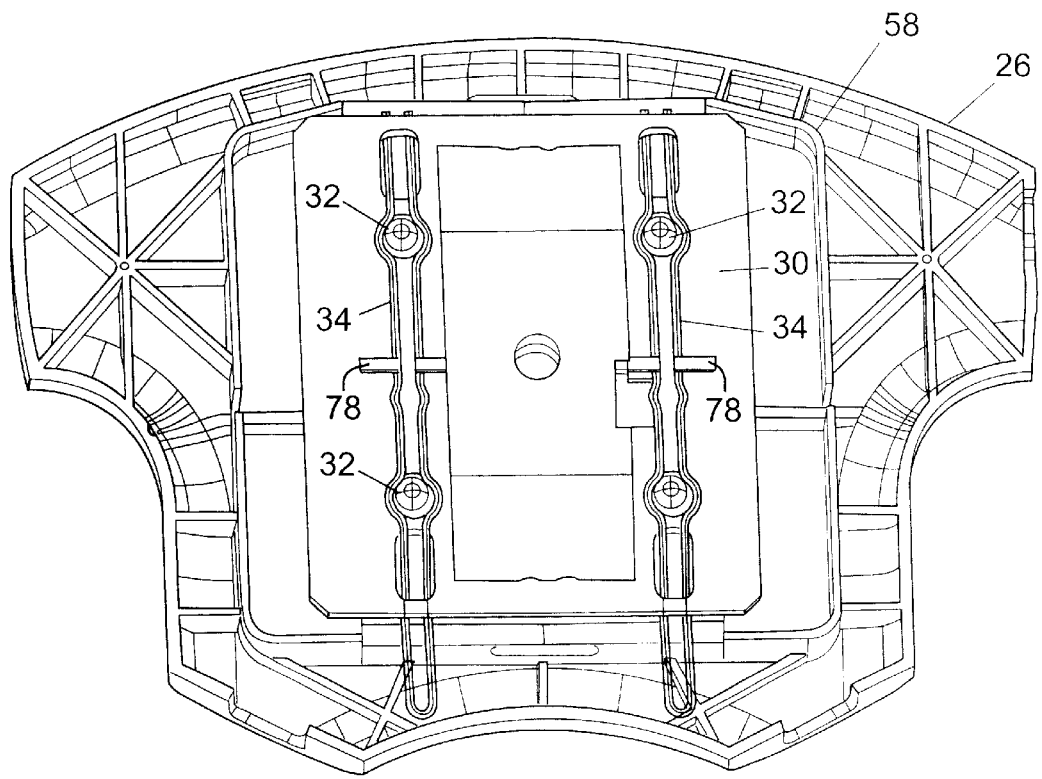
FIG. 5b shows a driver air bag module of the current invention with the attachment wires in the disassembly position.
Figure 6:
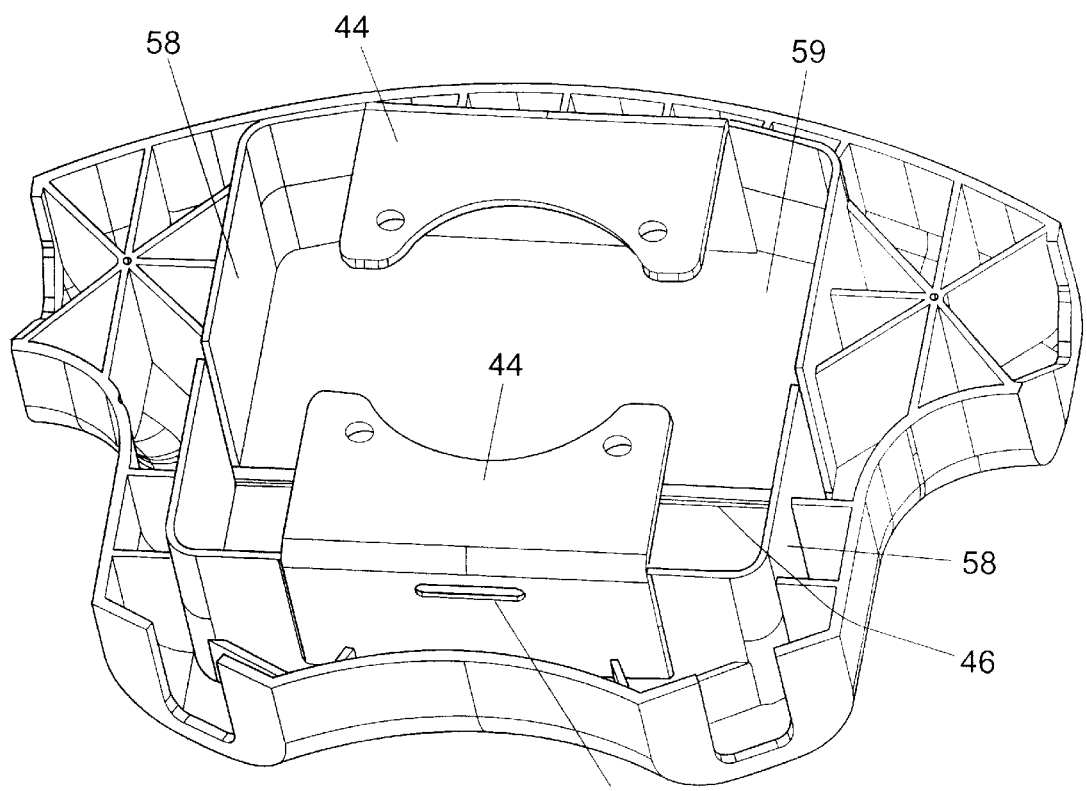
FIG. 6 is a rear view of the cover of the driver air bag of the current invention.
Figure 7:
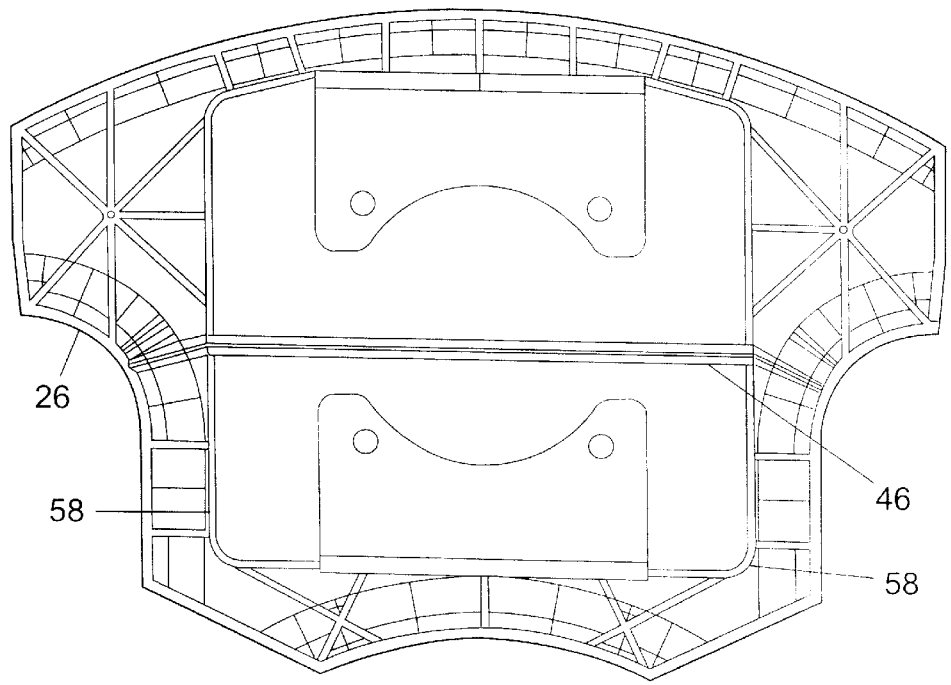
FIG. 7 is a plan view of the cover of the driver air bag module of the current invention.

To complete the assembly of a module, the snap-in attachment nuts 32 (shown in FIG. 8) are installed onto the threaded studs 28 as is shown in FIG. 4. These nuts 32 serve three purposes: the nuts, in combination with the studs 28, draw the retaining ring 24 and inflator flange 38 together to form a tight seal, they firmly attach the cover 26 to the inflator flange 38 (see FIG. 4), and they serve as a mounting feature with the steering wheel and more particularly with the hub or armature 30 of the steering wheel.

With the module in the configuration shown in FIG. 4, it is ready for shipment to an auto manufacturer's assembly plant. At the assembly plant, the steering wheel 200 is first fastened to the steering shaft. Then, the air bag module 10 is connected to the steering wheel by snapping the module into the steering wheel armature 30.

Figure 11:
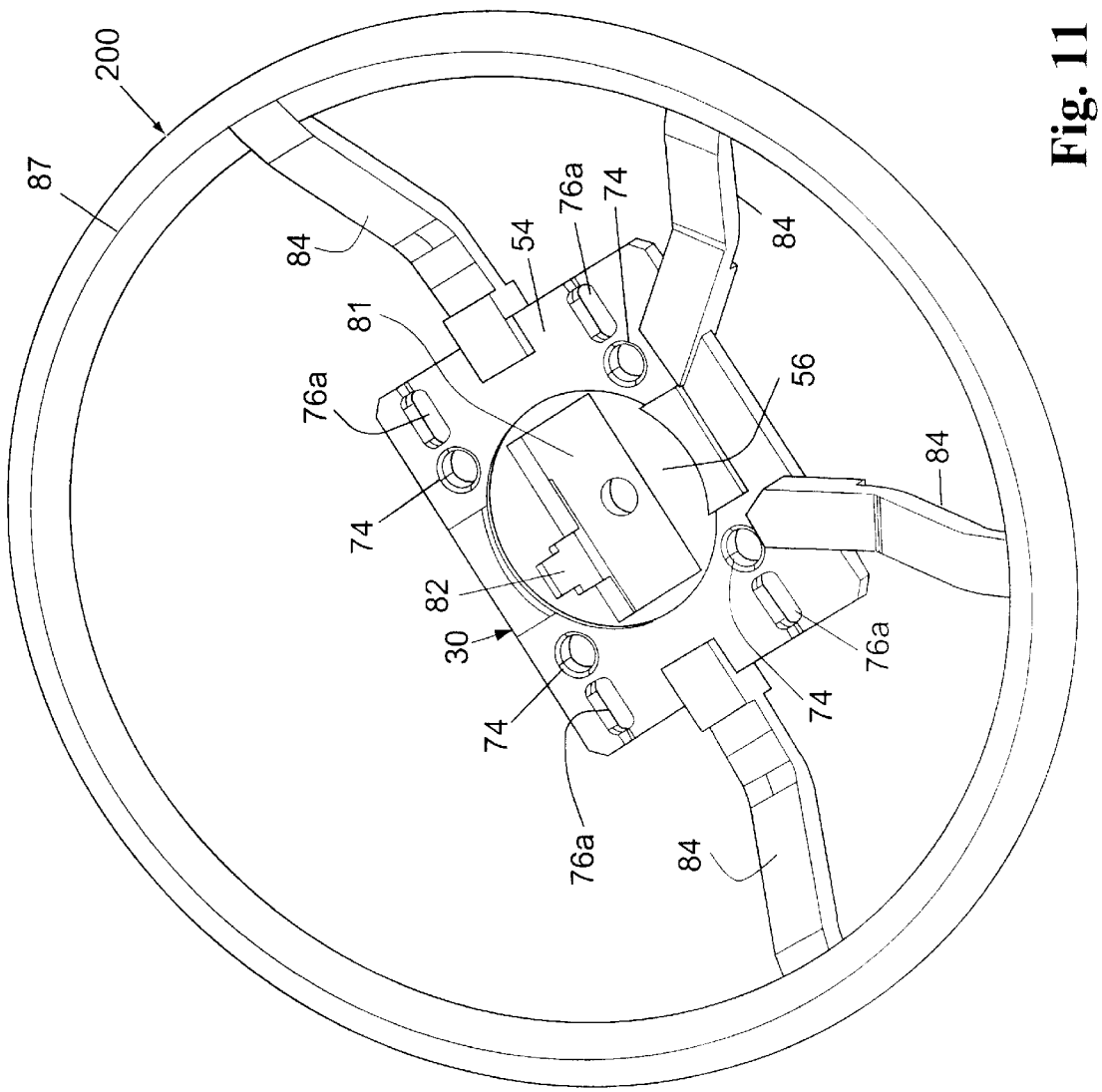
FIG. 11 is a plan view of a steering wheel of the current invention.
Figure 12:
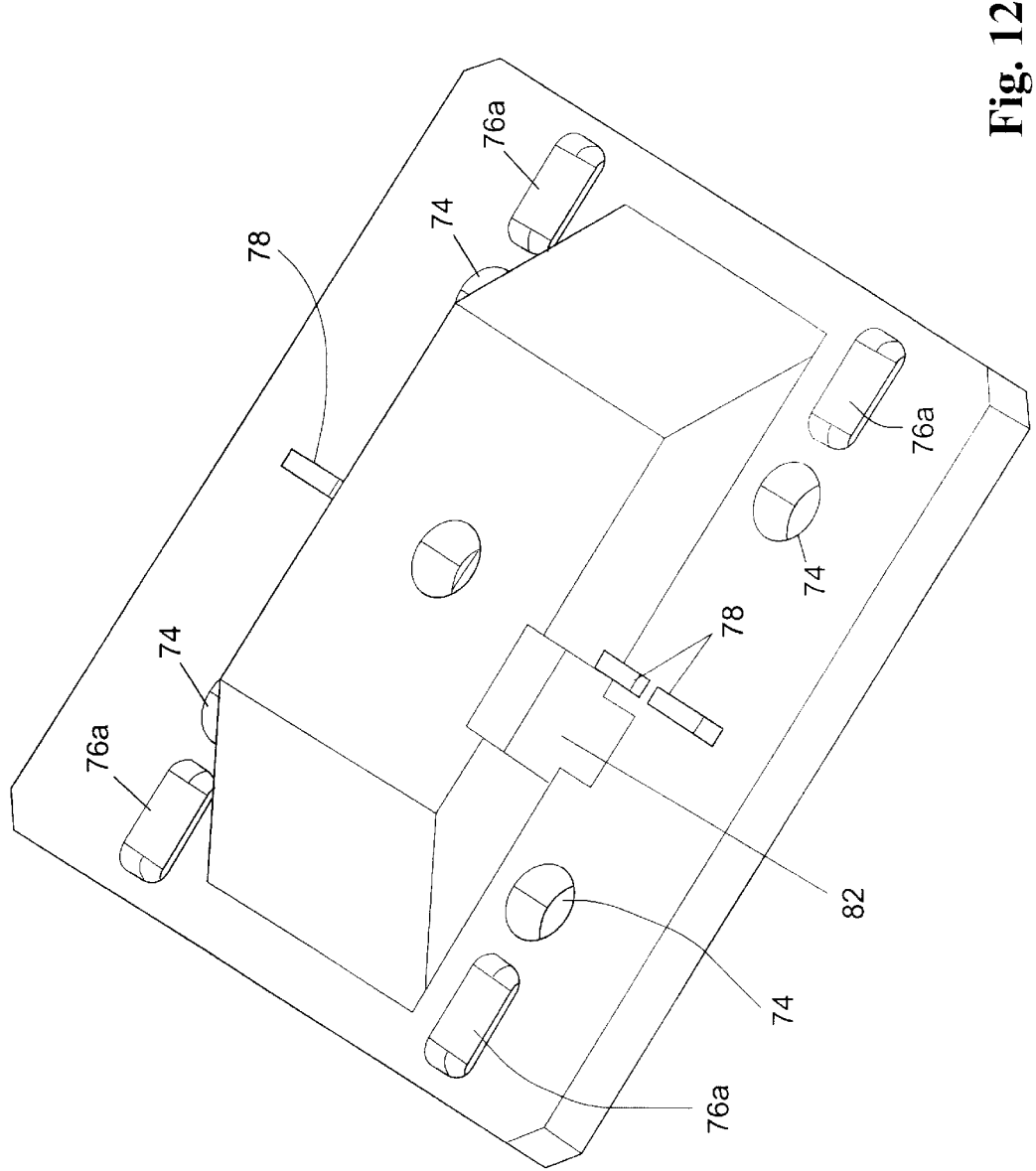
FIG. 12 is a plan view of the rear of the steering wheel with the spokes and rim removed for clarity.

FIGS. 11 and 12 show the major features of the steering wheel 200. The steering wheel 200 includes an armature or hub 30, a plurality of spokes 84 and a rim 87. The steering wheel armature 30 has a pair of retaining wire fasteners 34 disposed thereon. The retaining wire fasteners 34 are conformed to receive the snap-in attachment nut 32 of the module. The nut 32 initially spreads the retaining fastener 34 apart and the wire fastener 34 then engages a groove 48 disposed on the snap-in attachment nut 32. This is accomplished because as the snap-in attachment nuts 32 from the module are pushed into the locking portions 85 and 86 of each wire fastener 34, parallel wires of each fastener 34 spread apart. Once the groove 48 in the snap-in attachment nut 32 is reached, the parallel wires snap into the groove 48 to retain the module. Should the module 100 need to be serviced and removed from the steering wheel 200, a screwdriver or similar object is placed into the bend 80 on the end of the wire fastener 34, so that the wire can be moved until the disengaging loop 52 is aligned with the head of the pin. With the wire in this position, the module can easily be lifted off the steering wheel armature 30.

The armature 30 of the steering wheel is provided with a flat surface 54 containing installation points. The armature 30 of the wheel further contains a recessed hole 56 immediately behind the module to allow installation of the inflator. The flat top surface 54 is important for the functioning of the module as it functions as a reaction surface and ensures the cushion 22 will always deploy towards the occupant. Another benefit of this flat surface 54 is that if the surface were not flat, the cushion 22 would be forced along an uneven surface and could snag.

It is convenient to have the recess 56 directly behind the module for the inflator because this drastically decreases the package size of the module. This in turn can increase the distance from the module to the rim 87 of the wheel, potentially decreasing injuries to occupants that are close to the steering wheel.

Figure 8:
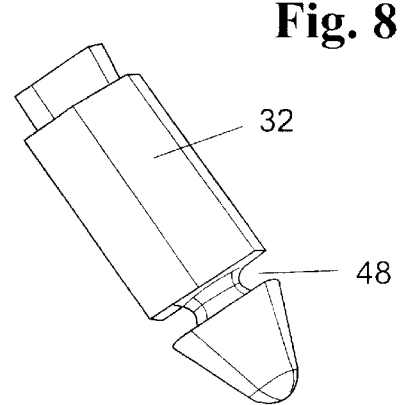
FIG. 8 is an isometric view of the snap-in attachment nut of the current invention.
Figure 9:
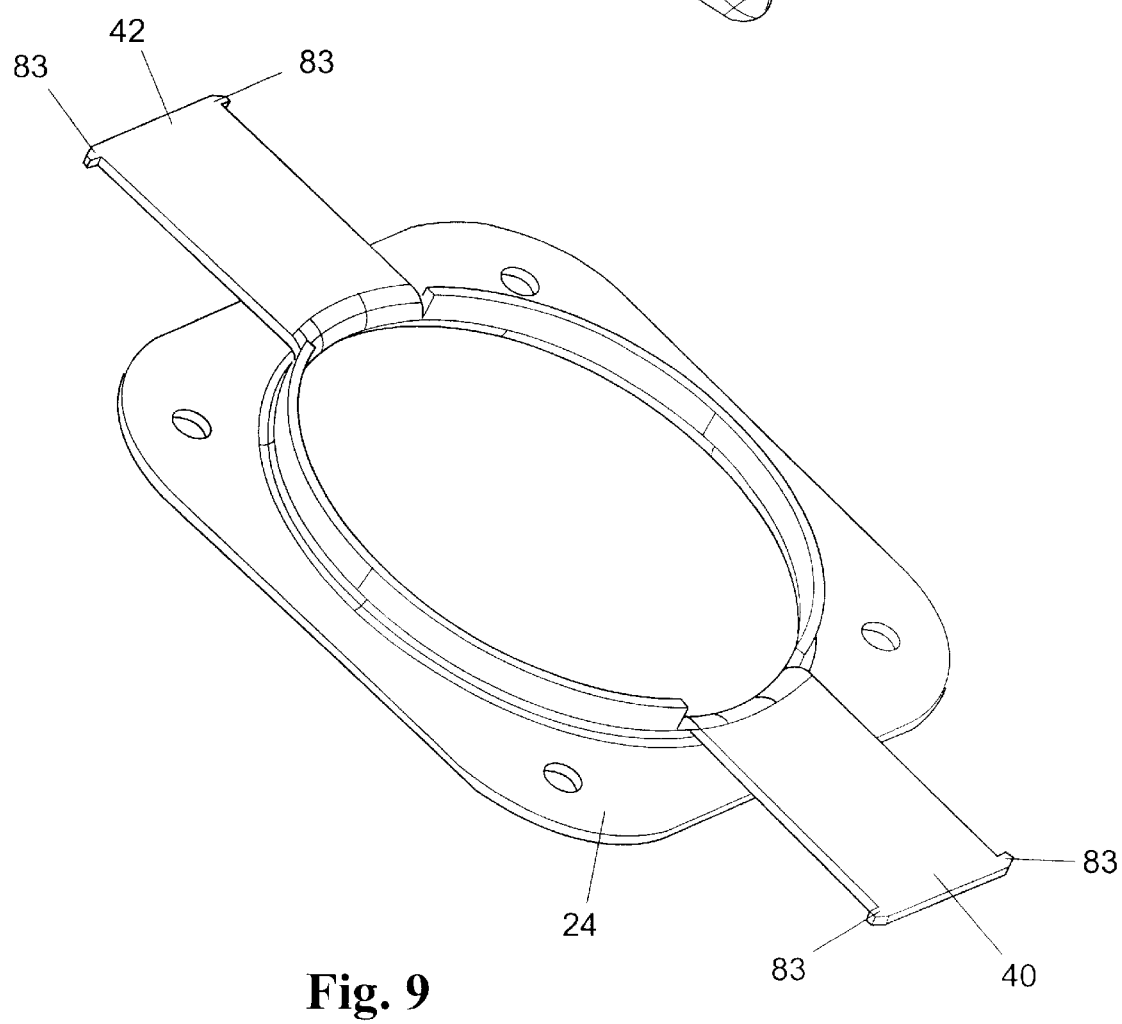
FIG. 9 is a retainer ring of the current invention.

FIG. 8 shows the snap-in attachment nut 32 of the current invention. This snap-in attachment nut 32 is mounted onto the retaining ring 24 that is shown in FIG. 9, and has a groove 48 for engaging the retention wires 34 (see FIGS. 5 and 10). FIG. 9 shows the retaining ring 24 of the current system. Incorporated onto the ring is a pair of tabs 40, 42 which engage a pair of slots 64, 66 in the cover.

Figure 10:
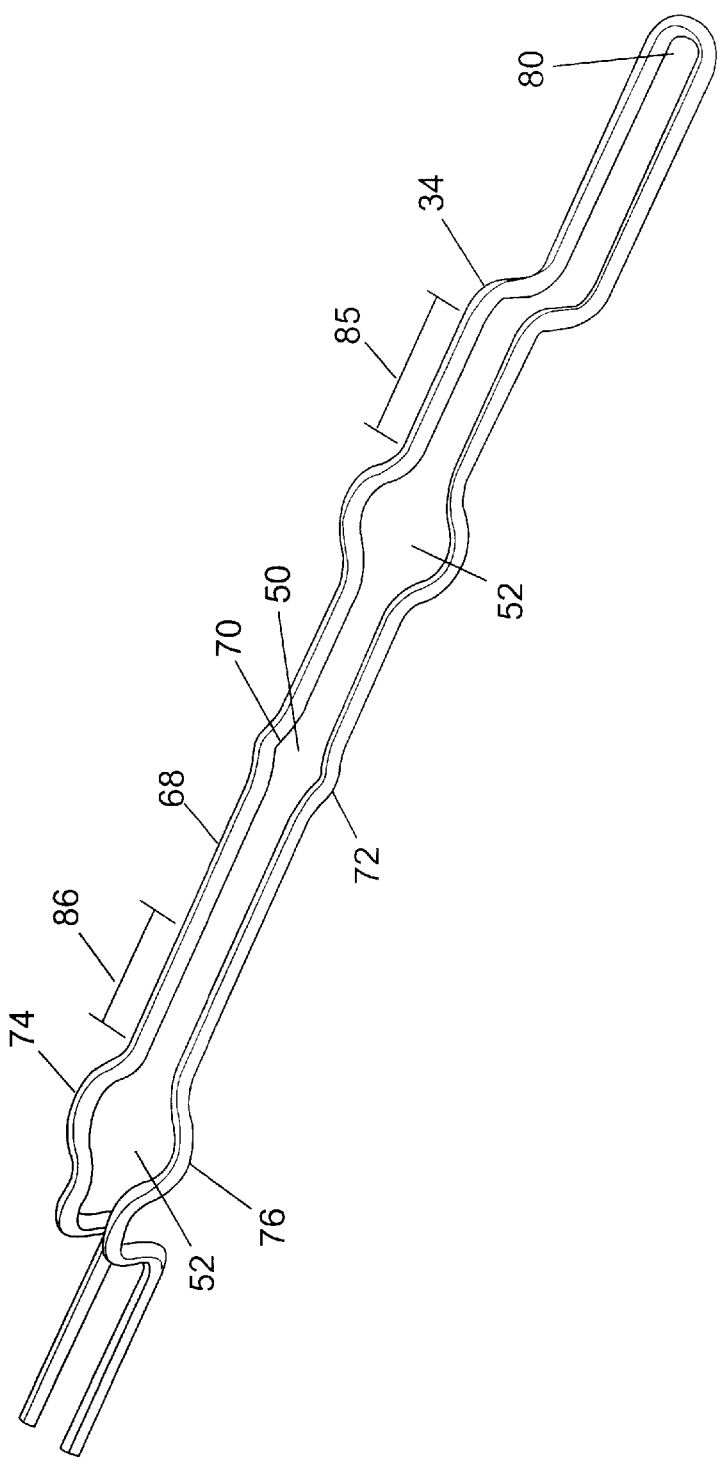
FIG. 10 is an enlarged view of the attachment wires of the current invention.

FIG. 10 shows the retention wires 34, which are slidably attached to the steering wheel armature 30. Each retention wire fastener 34 is bent to form a parallel set of wires 68. The wires define two adjacent first locking portions 85 and 86. Should the module experience vibration following assembly, the bend 50 (formed by curved wire portions 70 and 72) interacts with the post 78 (see FIGS. 5a, 5b and 12) on the armature to prevent the wire from moving out of position during vibration. The parallel wires 68 also define adjacent second radii portions 74, 76 which define first and second disengaging portions 52. When a module is to be removed from the steering wheel armature 30, an operator would grasp the mounting wires and slide the wires from the engaging locking portions 85 and 86 to the disengaging portions 52. When the operator attempts to move the wires into this position, the wires compress at the bend 50 to allow passage through the posts 78. The parallel wires 68 are incorporated onto the steering wheel armature 30.

As best seen in FIGS. 11 and 12, the steering wheel armature 30 has four apertures 74 for receiving snap-in attachment nut 32. The steering wheel armature 30 further has four slots 76a for receiving a pair of retaining wires 34. The slots 76a, in conjunction with the posts 78, hold the retaining wires 34 onto the armature 30 and ensure the parallel wire pairs 68 of each wire fastener 34 are kept in position. The armature 30 also has two pair of posts 78 located between the slots 76a. The posts 78 engage the parallel wires 68 of the retention wire 34 and prevent the parallel wires 68 from separating at this point. Additionally, the retention wire is positioned in the groove cut into the posts 78 so that when the snap-in attachment nut 32 is pushed into the wire, the wire spreads apart instead of moving in the same direction as the retention nut. The configuration allows the wire fastener 34 to separate at the four apertures 74 but gives the wire fastener 34 enough spring back to "capture" the engagement groove 48 of the attachment nut 32. In addition, these posts 78 interact with the attachment wire loop 50 to prevent the wire from moving out of position during vibration. This is possible because the distance to the outside radii of the loop is slightly larger than the groove cut into the posts 78. This prevents the wire from sliding unless a mechanic pulls the wire with sufficient force that the two parallel wires 68 compress, allowing it to pass through the groove.

The steering wheel armature 30 also has a recessed portion 81 (shown in FIG. 11), which allows for incorporation of the nut which mounts the steering wheel assembly to the steering column shaft and allows clearance for the connector necessary to ensure the inflator is electrically connected to the rest of the vehicle. The recessed portion 81 reduces the overall profile of the module/steering wheel assembly. In addition, a hole 82 is provided to allow the inflator connector wire to be passed from the vehicle to the top of the steering wheel.

What is claimed is:

1. An air bag module comprising:
    an inflator;
    a cushion;
    a retainer ring having at least one mounting tab;
    fasteners means for engaging the inflator, retainer ring and the cushion;
    a cover having a pair of flaps defining a plurality of apertures for engaging the fastener means; and
    wherein the cushion defines at least one slot; the mounting tab being partially disposed through the slot.

2. A steering wheel having an assembly armature and driver air bag module assembly comprising:
    an inflator;
    a cushion;
    a retainer ring having a plurality of fasteners for engaging the inflator and the cushion;
    a cover defining a plurality of apertures for engaging the fasteners;
    a plurality of snap-in attachment mechanisms disposed on the fastener means;
    wherein the armature defines a plurality of apertures for receiving the snap-in attachment mechanisms; and at least one retaining wire fastener for lockably engaging the snap-in attachment mechanisms;

wherein the armature further defines a plurality of slots for engaging the wire fastener.

3. The steering wheel assembly of claim 2 further including at least one pair of posts (78) for regulating the amount of elastic deformation of the retention wires (34) and preventing the wire from moving out of position during vibration.

4. The steering wheel assembly of claim 2 wherein the engagement portions of the retaining wires (34) engage a groove (48) defined in the snap-in adjustment nuts (32).

5. The steering wheel assembly of claim 2 wherein the cover (26) defines a central portion, the central portion having a tear seam (46) disposed thereon.

6. The apparatus as defined in claim 4 wherein the retainer includes a second radially extending mounting tab and the cover includes another slit to receive the second mounting tab.

7. The steering wheel assembly of claim 5 wherein the retaining wire fastener (34) is comprised of a pair of generally parallel wires (68), which defines at least one locking portion (85).

8. The steering wheel assembly of claim 5 wherein the retention wire fastener (34) further defines at least one disengaging portion (52).

9. The steering wheel assembly of claim 8 wherein the retaining wire fastener (34) is capable of being positioned in one of a first locking position or a first unlocking position.

10. A steering wheel having an assembly armature and driver air bag module assembly comprising:

an inflator;

a cushion;

a retainer ring having at least one mounting tab and a plurality of fasteners for engaging the inflator and the cushion;

a cover having a pair of flaps defining a plurality of apertures for engaging the fasteners;

a plurality of snap and attachment nuts disposed on the fastener;

wherein the armature defines a plurality of apertures for receiving the snap-in attachment nuts; and at least one retaining wire fastener for lockably engaging the snap-in attachment nuts;

wherein the retaining wire attachment is defined by a pair of generally parallel wires defining a first set of locking portions and a second set of disengaging portions and wherein the retaining wires are capable of being moved from a first engaged position to a second disengaged position.

11. A steering wheel having an assembly armature (30) and driver air bag module assembly comprising:

an inflator (20);

a cushion (22);

a retainer ring (24) having at least one mounting tab (40) and a plurality of fasteners (28) for engaging the inflator (20) and the cushion (22);

a cover (26) having a pair of flaps (44) defining a plurality of apertures for engaging the fasteners (28);

a plurality of snap-in attachment nuts (32) disposed on the fastener;

wherein the armature (30) defines a plurality of apertures (74) for receiving the snap-in attachment nuts (32); and at least one retaining wire fastener (34) for lockably engaging the snap-in attachment nuts (32);

wherein the cushion (22) defines at least one slot (41), the mounting tab (40) being at least partially disposed through the slot (41).

12. The steering wheel assembly of claim 11 wherein the retaining wire fastener (34) is slidably engaged with the armature (30).

13. A steering wheel assembly having an armature (30) and a driver air bag module comprising:

an inflator (20);

a cushion (22) defining at least one slot (41);

a retainer means (24) for retaining the cushion (22) and inflator (20) to the armature (30), the retainer means (24) having at least one mounting tab (40) disposed through the slot (41);

a cover (26) defining at least one aperture (64) for engaging the mounting tab (40);

at least one snap end attachment nut (32);

at least one retaining wire fastener (34) for engaging the snap end attachment nut (32).

14. A steering wheel having an assembly armature and driver air bag module assembly comprising:

an inflator;

a cushion;

a retainer ring having a plurality of fasteners for engaging the inflator and the cushion;

a cover defining a plurality of apertures for engaging the fasteners;

a plurality of snap-in attachment mechanisms disposed on the fastener means;

wherein the armature defines a plurality of apertures for receiving the snap-in attachment mechanisms; and at least one retaining wire fastener for lockably engaging the snap-in attachment mechanisms; the retaining wire fastener comprised of a pair of generally parallel wires, which defines at least one locking portion;

wherein the armature (30) has at least one pair of posts (78); the pair of generally parallel wires (68) being disposed between the pair of posts (78).

15. An air bag module comprising:

an inflator;

a cushion defining a cavity;

a retainer ring having at least a first and a second radially extending mounting tab, at least a portion of the retaining ring being within the cavity;

a plurality of fasteners, oriented generally perpendicular to the at least one mounting tab; and a cover having a pair of flaps defining a plurality of apertures for receiving the fasteners and at least a first and second slit for receiving a respective one of the radially extending mounting tabs.

* * * * *